Figure 3:
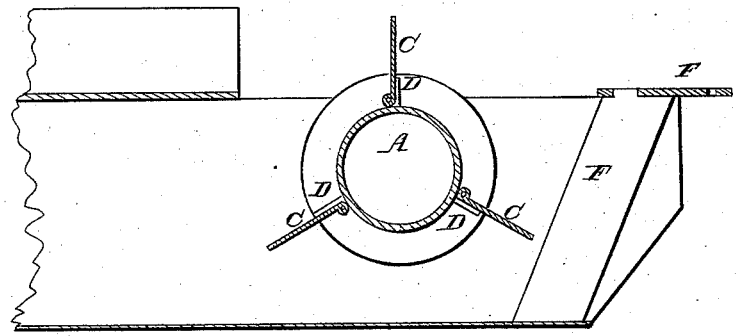

R. H. EMERSON.
Clod-Crusher.
No. 57,105.
2 Sheets—Sheet 1
Patented Aug. 14, 1866.
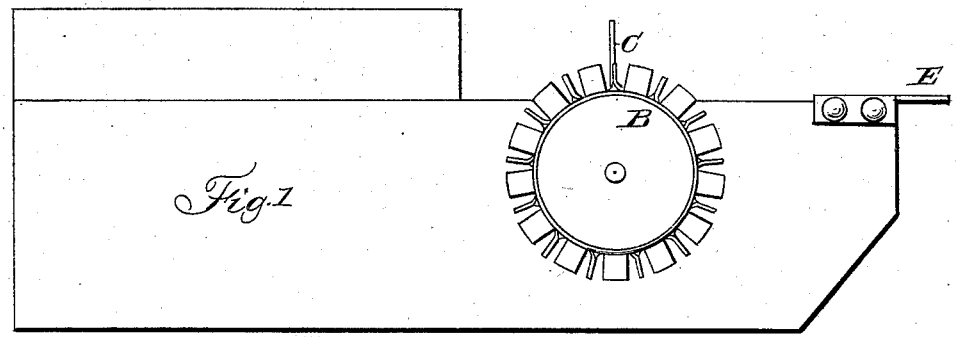
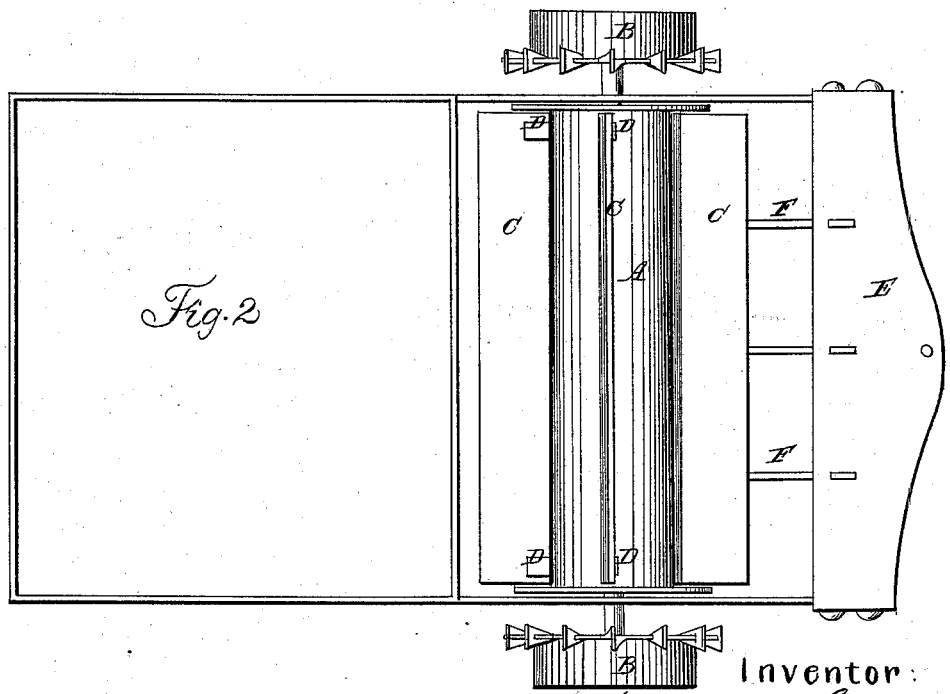
Witnesses:
J. Clement Smith
John P. Jacobs
Inventor:
Richard H. Emerson
Chipman & Co
attys.

R. H. EMERSON.
Clod-Crusher.

No. 57,105.

2 Sheets—Sheet 2.

Patented Aug. 14, 1866.

Witnesses:
J. Clement Smith
John P. Jacobs

Inventor:
Richard H Emerson
Chipman & Co
Attys

UNITED STATES PATENT OFFICE.

RICHARD H. EMERSON, OF FOND DU LAC, WISCONSIN.

IMPROVEMENT IN MACHINES FOR CUTTING TURF.

Specification forming part of Letters Patent No. 57,105, dated August 14, 1866.

*To all whom it may concern:*

Be it known that I, RICHARD H. EMERSON, of Fond du Lac, in the county of Fond du Lac and State of Wisconsin, have invented a new and valuable Machine for Cutting Turf; and I do hereby declare that the following is a full, clear, and exact description of the construction and operation of the same, reference being had to the annexed drawings, making a part of this specification, and to the letters and figures of reference marked thereon.

The nature of my invention consists in constructing a machine by which sods or turf may be cut and removed from the ground in pieces of such size and shape as may be desirable by horses or other suitable motive power.

I construct my machine in the form represented on the drawings, Figure 2 somewhat resembling in shape the square body of a buggy-wagon with the front end of the bottom thereof sloping downward like a dirt-scraper; or I make it flat, which is preferable.

Letter A represents a shaft that revolves in bearings on the sides of the box, and has at each end thereof, on the outside of the box, a wheel which rolls on the ground and is provided with sharp points or dogs on its periphery to secure accuracy in the movement of the knives on said shaft next mentioned. These wheels are marked B on the drawings.

Letter C is a series of knives placed on said shaft longitudinally and operating therewith. The ends of said knives are attached to the shaft by hinges, and suitable stops are arranged at D to regulate the movement of said knives and allow them to swing on their hinges but one way only—namely, backward—on said shaft, when the machine moves forward.

Letter E is a cross-bar attached to the front end of the machine by suitable bolts, nuts, and screws, so that it may be easily removed and replaced. It is the bar to which I attach the motive power that propels the machine, and also serves as a rest for the upper end of the knives F, hereinafter mentioned.

Letter F is a series of knives, one end of which rests in suitable openings or slots on the bottom of the machine, and the other rests in openings or slots in the cross-bar E, as represented. The number of these knives and their relative distance from each other is regulated at will, and the width of the turf cut is always determined by such number and distance.

The front end of the bottom of my machine is usually constructed with sharp teeth adjusted for cutting the bottom of the sod.

Figure 4:
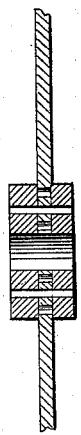

I sometimes construct the wheels of my machine in the form represented on Fig. 4, with spokes or arms set in slots or openings in the hubs thereof. These spokes or arms are adjustable by means of pins that pass through them and attach them to the said wheel-hubs. I make them adjustable in this form in order to increase or diminish the size of the wheel, and thereby regulate the thickness of the turf to be cut.

My machine operates as follows: I attach the motive power to the cross-bar E and set the machine in motion. The sharp teeth on the bottom are drawn into the ground and under the sod to the desired depth, and the knives F cut said sod into strips of the desired width, which is always regulated by the number of the knives F and their relative distances from each other. In the meantime the wheels revolve the shaft A, and the knives C cut the sods into pieces of such length as the operator may desire. The number and position of the knives C always determine the length of such pieces. After the sods are thus cut and divided they pass rearward in the box and are ready for use.

The machine may be ballasted by weights placed thereon in any suitable manner, but I prefer to place such weights in a box adjusted on the top of the machine-box.

What I claim as my invention, and desire to secure by Letters Patent, is—

A machine for cutting turf, having a shaft, A, wheels B, stops D, knives C and F, constructed and arranged substantially as herein specified.

RICHARD H. EMERSON.

Witnesses:
J. CLEMENT SMITH,
C. L. GILMORE.